Le R. S. WHITE,
Assignor to Brown & Brothers.
TABLE-FORK.
No. 7,700. Reissued May 22, 1877.
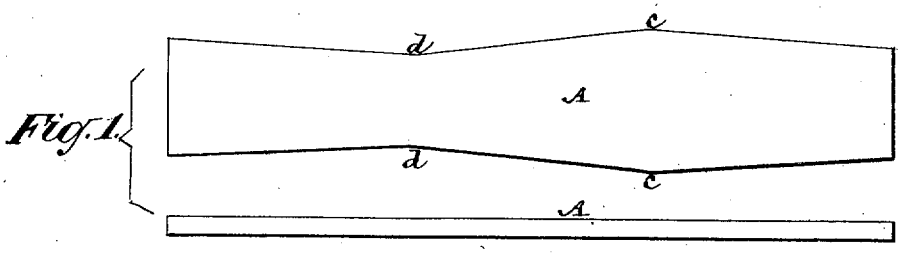
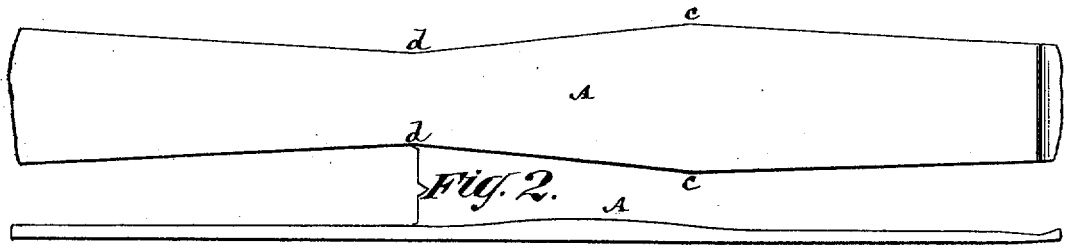
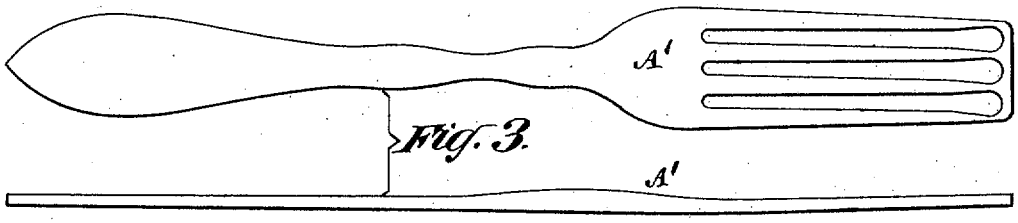
Witnesses
John Becker
Geo. Kaynce
Inventor
Le Roy S White
by his Attorney
Brown & Allen
N. PETERS, PHOTO-LITHOGRAPHER, WASHINGTON, D. C.

UNITED STATES PATENT OFFICE.

LE ROY S. WHITE, OF WATERBURY, CONNECTICUT, ASSIGNOR TO BROWN & BROTHERS, OF SAME PLACE.

IMPROVEMENT IN TABLE-FORKS.

Specification forming part of Letters Patent No. 180,403, dated July 25, 1876; reissue No. 7,700, dated May 22, 1877; application filed April 3, 1877.

DIVISION B.

*To all whom it may concern:*

Be it known that I, LE ROY S. WHITE, of Waterbury, in the county of New Haven and State of Connecticut, have invented a new and useful Improvement in the Manufacture of Table-Forks, which improvement is fully set forth in the following specification and accompanying drawing:

This invention relates to the manufacture of table-forks from German silver or albata and other metals or alloys, in which the entire article, including its handle, is made from the same piece of metal.

For the purpose of more clearly defining my invention, and the advantages which are to be derived from it, I will here first briefly refer to the previous state of the art.

Heretofore it has been customary in manufacturing table-forks, as above referred to, first to cut a number of primary blanks, of uniform width throughout their length, from a sheet, plate, or bar of uniform thickness, and, after annealing such blanks, to grade them by rolling them taper from that portion which is to form the shanks of the forks toward opposite ends, and afterward to cut out from such primary blanks secondary blanks, having a profile of the form desired for the forks, and, after annealing such secondary blanks, to stamp and otherwise form them into forks.

In thus manufacturing table-forks from a primary blank of uniform width there is necessarily considerable waste or scrap produced in cutting out the secondary blank from the primary one.

The object of this invention is to reduce the scrap.

The invention consists in a primary fork-blank of novel form or construction, whereby scrap is very materially economized in the cutting out of the secondary blank from the primary one.

Figure 1 represents face and edge views of a primary blank for a table-fork cut, in accordance with my invention, from a sheet of metal of uniform thickness, and annealed. Fig. 2 represents face and edge views of such blank after it has been rolled to grade. Fig. 3 represents face and edge views of a secondary blank cut, as required to form a fork, from the graded primary blank, and annealed.

Referring, in the first instance, to Fig. 1, my improved primary blank A, as cut from a plate, bar, or sheet of metal, is of such form or construction that the profile of its face presents a series of alternately-reversed tapers—that is to say, of a diminishing width or taper from *c c*, whence the broad part of the fork at the head of the prongs is to be cut to the nearest end of the blank whence the points of the prongs are cut, and of a diminishing width or taper in a reverse or backward direction from *c c* to *d d*, which is about half-way to the other end, whence the head or tip is cut, and of any increasing width from *d d* to the latter end.

Such blank, after it has been rolled to grade or tapered off on its face toward opposite ends, as shown in Fig. 2, has the secondary blank A′, Fig. 3, cut or punched from it, with very much less waste or scrap than when the same is cut from a primary blank of uniform width throughout its length, the saving being made especially at that portion out of which the shank part of the secondary blank and of the fork is formed.

This very important reduction of the scrap in working up the primary blank does not involve the making of any intervening scrap in cutting a series of primary blanks from a plate or sheet, inasmuch as the same may be cut in matching relation with each other, side by side, from the plate or sheet.

I claim—

A fork-blank the profile of the face of which presents a series of alternately-reversed tapers, substantially as herein described.

LE ROY S. WHITE.

Witnesses:

FRANK PARTREE,
PHILO BROWN.